(12) United States Patent
Mickle et al.

(10) Patent No.: US 8,090,414 B2
(45) Date of Patent: *Jan. 3, 2012

(54) RECHARGING METHOD AND APPARATUS

(75) Inventors: Marlin H. Mickle, Pittsburgh, PA (US);
Christopher C. Capelli, Kenosha, WI (US); Harold Swift, Gibsonia, PA (US);
Leonid Mats, Pittsburgh, PA (US);
Minhong Mi, Sewickley, PA (US);
Charles E. Greene, Pittsburgh, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/332,463

(22) Filed: Dec. 11, 2008

(65) Prior Publication Data
US 2009/0098915 A1 Apr. 16, 2009

Related U.S. Application Data

(60) Continuation of application No. 11/265,832, filed on Nov. 3, 2005, now Pat. No. 7,567,824, which is a division of application No. 11/021,978, filed on Dec. 23, 2004, now Pat. No. 7,440,780, which is a continuation-in-part of application No. 10/459,051, filed on Jun. 11, 2003, now Pat. No. 7,373,133.

(60) Provisional application No. 60/411,825, filed on Sep. 18, 2002.

(51) Int. Cl.
*H04B 1/38* (2006.01)
*H04B 1/00* (2006.01)

(52) U.S. Cl. ........... 455/573; 455/343.1; 320/101; 343/701

(58) Field of Classification Search .......... 455/41.1, 455/41.2, 127.1, 127.5, 128, 129, 90.1–90.3, 455/572–574, 575.1, 550.1, 333, 343.1, 343.5, 455/343.6, 344, 290–291; 320/101, 102, 320/124, 127, 137, 138; 343/701–703, 720
See application file for complete search history.

(56) References Cited

U.S. PATENT DOCUMENTS
3,678,305 A 7/1972 Paige
(Continued)

FOREIGN PATENT DOCUMENTS
JP 10-257697 9/1998
(Continued)

OTHER PUBLICATIONS

"A 0.5-mW Passive Telemetry IC for Biomedical Applications", by Quiting Huang et al., IEEE Journal of Solid-State Circuits, vol. 33, No. 7, Jul. 1998.

(Continued)

*Primary Examiner* — Pablo Tran
(74) *Attorney, Agent, or Firm* — Eckert Seamans Cherin & Mellott, LLC; Philip E. Levy, Esquire

(57) ABSTRACT

The present invention provides apparatus and an associated method for remotely energizing power storage devices. Energization may preferably be effected through the use of RF energy from a base station, ambient energy or ultra-wide band energy. The remote station preferably has at least one antenna having an effective area greater than its physical area. The system may have an antenna and associated circuitry provided on an electronic chip such as a monolithic chip or on a printed circuit with a suitable substrate.

20 Claims, 4 Drawing Sheets

U.S. PATENT DOCUMENTS

| | | | |
|---|---|---|---|
| 4,114,151 | A | 9/1978 | Denne et al. |
| 4,471,344 | A | 9/1984 | Williams |
| 4,517,563 | A | 5/1985 | Diamant |
| 4,700,179 | A | 10/1987 | Fancher |
| 4,857,893 | A | 8/1989 | Carroll |
| 5,296,866 | A | 3/1994 | Sutton |
| 5,523,659 | A | 6/1996 | Swenson |
| 5,673,018 | A | 9/1997 | Lowe et al. |
| 5,731,762 | A | 3/1998 | Gila et al. |
| 5,767,792 | A | 6/1998 | Urbas et al. |
| 5,833,603 | A | 11/1998 | Kovacs et al. |
| 5,889,383 | A | 3/1999 | Teich |
| 5,952,814 | A | 9/1999 | Van Lerberghe |
| 5,970,398 | A | 10/1999 | Tuttle |
| 6,037,743 | A | 3/2000 | White et al. |
| 6,054,925 | A | 4/2000 | Proctor et al. |
| 6,100,804 | A | 8/2000 | Brady et al. |
| 6,127,799 | A | 10/2000 | Krishnan |
| 6,130,603 | A | 10/2000 | Briechle |
| 6,141,763 | A | 10/2000 | Smith et al. |
| 6,177,872 | B1 | 1/2001 | Kodukula et al. |
| 6,184,651 | B1 | 2/2001 | Fernandez et al. |
| 6,184,789 | B1 | 2/2001 | Richley et al. |
| 6,229,443 | B1 | 5/2001 | Roesner |
| 6,284,651 | B1 | 9/2001 | Sharan et al. |
| 6,289,237 | B1 | 9/2001 | Mickle et al. |
| 6,310,465 | B2 | 10/2001 | Najima |
| 6,335,686 | B1 | 1/2002 | Goff et al. |
| 6,373,447 | B1 | 4/2002 | Rostoker et al. |
| 6,411,199 | B1 | 6/2002 | Geiszler et al. |
| 6,463,039 | B1 | 10/2002 | Ricci et al. |
| 6,480,699 | B1 * | 11/2002 | Lovoi .......................... 455/41.2 |
| 6,563,319 | B1 * | 5/2003 | Kraz ............................ 324/458 |
| 6,603,309 | B2 | 8/2003 | Forgang et al. |
| 6,611,783 | B2 | 8/2003 | Kelly, Jr. et al. |
| 6,615,074 | B2 | 9/2003 | Mickle et al. |
| 6,693,584 | B2 | 2/2004 | Horst et al. |
| 6,744,335 | B2 | 6/2004 | Ryhanen |
| RE38,547 | E | 7/2004 | Hartai |
| 6,789,429 | B2 | 9/2004 | Pinto et al. |
| 6,803,774 | B2 | 10/2004 | Park |
| 6,842,606 | B1 | 1/2005 | Takemura |
| 6,907,231 | B2 | 6/2005 | Bhatti |
| 6,995,731 | B2 | 2/2006 | Lin |
| 7,002,174 | B2 | 2/2006 | Il'ichev et al. |
| 7,081,386 | B2 | 7/2006 | Ozawa et al. |
| 7,103,460 | B1 * | 9/2006 | Breed ............................ 701/29 |
| 7,190,729 | B2 * | 3/2007 | Siwiak .......................... 375/259 |
| 2001/0042920 | A1 | 11/2001 | Iwasaki et al. |

FOREIGN PATENT DOCUMENTS

| | | |
|---|---|---|
| JP | 2000-137779 | 5/2000 |
| JP | 2002-078247 | 3/2002 |
| WO | 98/52155 | 11/1998 |
| WO | 0013438 | 3/2000 |

OTHER PUBLICATIONS

"A Broadband Rectenna Array for RF Energy Recycling", by Florian B. Helmbrecht, University of Colorado at Boulder, submitted to the Technische Universitat Munchen, Sep. 2002.

"A High Conversion Efficiency 5.8 GHz Rectenna", by James O. McSpadden et al., 1997 MTT-S Digest.

"ASIC-Based Batteryless Implantable Telemetry Microsystem for Recording Purposes", by J. Parramon et al., Proceedings—19th International Conference—IEEE/EMBS Oct. 30-Nov. 2, 1997 Chicago, IL. USA.

A Wireless Implantable Multichannel Digital Neural Recording System for a Micromachined Sieve Electrode, by Tayfun Akin et al., IEEE Journal of Solid-State Circuits, vol. 33, No. 1, Jan. 1998.

"Energy Harvesting, Profiles, and Potential Sources", by Marlin Mickle et al, International Journal of Parallel and Distributed Systems and Networks, vol. 4, No. 3, 2001.

"Planar Rectennas for 2.45GHz Wireless Power Transfer", by Jouko Heikkinen et al., Tamrpere University of Technology, 0-7803-6267-5/00/$10.00 © IEEE, May 2000.

"Wireless Telemetry for Gas-Turbine Applications", by Russell G. DeAnna, U.S. Army Research Laboratory, Glenn Research Center, Cleveland, Ohio, Mar. 2000, NASA/TM-2000-209815, ARL-MR-474.

Soohoo, "Magnetic Thin Film Inductors for Integrated Circuit Applications", IEEE Transactions on Magnetics, vol. MAG-15, No. 6, pp. 1803-1805 (Nov. 1979).

Salch and Qureshi, "Permalloy Thin Film Inductors", Electronic Letters, vol. 6, No. 26, pp. 850-852 (Dec. 31, 1970).

Rheinhold Rudenberg, "The Reception of Electrical Waves in Wireless Telegraphy", Annalen der Physik IV, 25, 1908, p. 466.

* cited by examiner

RECHARGING METHOD AND APPARATUS

CROSS-REFERENCE TO RELATED APPLICATION

This application is a continuation of U.S. patent application Ser. No. 11/265,832, filed Nov. 3, 2005 entitled "RECHARGING METHOD AND APPARATUS, which is a Divisional of U.S. patent application Ser. No. 11/021,978 entitled "RECHARGING METHOD AND APPARATUS" filed Dec. 23, 2004, which is a Continuation-In-Part of U.S. Ser. No. 10/459,051 filed Jun. 11, 2003, entitled "RECHARGING METHOD AND APPARATUS" which, this application claims the benefit of U.S. Provisional Application Ser. No. 60/411,825, entitled "RECHARGING METHOD" filed Sep. 18, 2002.

BACKGROUND OF THE INVENTION

1. Field of the Invention

This invention relates to a method and associated apparatus for remote energizing of power storage devices and particularly to a method employing small apparatus for remote energizing of power storage devices using RF. The method of this invention preferably employs at least one antenna that has an effective area greater than its physical area to harvest energy.

2. Description of the Prior Art

Contactless electrical connections are well known in the field of portable electrical devices. For example, portable motorized toothbrushes typically contain a rechargeable battery, which is charged by induction. The inductive charging device is also called an electromagnetic, non-contact type battery charging device. The inductive charging device is advantageous in that it cannot be hindered by a bad electrical contact unlike the charging device that requires an electrical connection. Inductive charging devices typically consist of inductive coupler for transferring energy from a primary side of the inductive coupler on a charging device to a secondary side of the inductive coupler on the electronic device. Examples of inventions utilizing inductive charging include U.S. Pat. No. 6,284,651, U.S. Pat. No. 6,310,465 and U.S. Pat. No. 5,952,814. A major problem with inductive charging is that the charging device needs to be in close proximity to the electronic device in order to energized power storage devices in the electronic device.

To overcome the problems associated with inductive charging, charging devices using RF electromagnetic field radiated into free space have been described. U.S. Pat. No. 6,127,799 describes a charge storage device that is charged by exposing the charge storage device to an RF electromagnetic field radiated into free space. The charge storage device includes one or more antennas disposed on the device and adapted to receive the radiated RF electromagnetic field. One or more rectifiers are connected to the antennas for rectifying the received RF electromagnetic field into a DC output current. The DC output current produced by the rectifier is used to energize the charge storage device.

As disclosed in U.S. Pat. No. 6,127,799, the antennas may be one or more dipole antennas which are combined to form at least two subsets of dipole antenna element arrays, wherein one subset may be oriented at an acute or a right angle with respect to at least one other subset. The antennas or dipole antennas may be placed on more than one outside surface of the charge storage device, which enclose an acute or a right angle with respect to each other. The use of RF energy and antennae to develop remote charging using the technology disclosed in U.S. Pat. No. 6,127,799 has a shortcoming in that the power conversion efficiency of the antenna array in the disclosed invention is dependent on the number of dipoles. Also, the size of the dipole antennas for the device do not make it practical for the majority of portable electronic devices (e.g., cellular telephones, portable electronic games, digital camera's and the like). In this prior disclosure, the dipole antennas are used to cover more than one side of a battery that has a width of 12.5 cm.

An approach to overcoming the problems of prior art is through the use of antennas formed on electronic chips. Examples of prior art that disclose on-chip antennas include U.S. Pat. No. 4,857,893 (Carroll) and U.S. Pat. No. 6,373,447 (Rostoker).

The preferred approach as disclosed in U.S. Pat. No. 4,857,893 is to use a deposition technique that effectively creates a single monolithic chip assembly that includes all of the circuitry necessary to produce a functionally complete transponder unit. This patent discusses the use of magnetic film inductors on the chip to allow a reduction in the number of turns, and thereby make the fabrication of such inductors feasible. This patent references Soohoo, "Magnetic Thin Film Inductors For Integrated Circuit Applications", IEEE Transactions in Magnetic, Vol. MAG-15, No. 6, pp. 1803-1805 (November 1979) and Salch and Qureshi, "Permalloy ThinFilm Inductors", Electronic Letters, Vol. 6, No. 26, pp. 850-852 (Dec. 31, 1970). This patent discusses the construction of the antenna on a chip as follows: A 10-turn square spiral coil for use at 10 MHz is constructed having an outer diameter of 1 cm×1 cm. The conducting path width is 0.005 inches. The spacing between turns is 0.001 in. The copper path is deposited by vacuum evaporation and then thickness is built up to about 25 micrometers by electroplating. Two permalloy magnetic films, having a thickness of from 1000-3000 Angstroms, surround the conductors, one on top, and the other on the bottom. The film is evaporated in an orienting magnetic field in such a way that the long dimension is parallel to the field and, therefore, is the easy direction of magnetization of the film. When a high-frequency current passes in the coil, the magnetic films are driven in a hard direction, and the two magnetic films around each conductor act as a magnetic core enclosing a 1-turn coil. The effect of the magnetic films is to increase the inductance of the coil in addition to its free-space inductance. The magnetic permeability is quite large, as the films are driven in the hard direction. Further, an insulating silicon-monoxide layer (SiO, 10,000 A thick) separates each magnetic film from the conducting path.

The problem with the approach as disclosed by Carroll U.S. Pat. No. 4,857,893 is the need to deposit a permalloy magnetic film, or other suitable material having a large magnetic permeability and electrical insulating properties in order increase the inductance of the coil. This increases the cost and complexity of the antenna of a chip. It also limits the ability to shrink the size of the antenna because of the need for magnetic film layers between the antenna coil(s).

U.S. Pat. No. 6,373,447 (Rostoker) discloses the use of one or more antennas that are formed on an integrated circuit (IC) chip and connected to other circuitry on the IC chip. Antenna configurations are disclosed that include loop, multi-turn loop, square spiral, long wire, or dipole. The antenna as disclosed could be formed to have two or more segments, which can selectively be connected to one another to alter an effective length of the antenna. Furthermore, two antennas may be formed in two different metallization layers separated by an insulating layer. A major shortcoming of this prior art is that the inventors teach that the antenna's transmitting and receiving strength "is proportional to the number of turns and area of the loop."

There remains a need for small remote power charger device and associated method that have a means for receipt of transmitted energy from the environment and energizing power storage devices on an object of interest wherein the power charger device is not dependent on inductive charging.

There is also a need for a small remote power charger device and associated method having a means for receipt of transmitted energy from the environment and energizing power storage devices on an object of interest using one or more antenna(e) on a substrate.

Finally, there is a need for a small remote power charger device and associated method that uses one or more antenna (e) on a substrate wherein the strength of the antenna is not dependent on magnetic induction or number of turns and area of the loop of the antenna.

SUMMARY OF THE INVENTION

The present invention has met the above-described needs.

It provides a method and apparatus of energizing a power storage device which has a base station and a remote station having an antenna for receiving power and a power storage device. Energy is transmitted in space from the base station to the remote station. The antenna employed preferably has an effective area greater than its physical area. Transmitted energy is received by the antenna and converted to DC power which is employed to energize the power storage device.

In another embodiment ambient energy from the environment is employed.

In another embodiment ultra-wide band frequency transmitted is employed.

The antenna may be formed on an electronic chip or printed circuit board. A monolithic chip having both the antenna and the circuitry may be employed.

It is an object of the present invention to provide a method and apparatus for remotely energizing a power storage device without employing direct wiring.

It is a further object of the present invention to provide such a method and apparatus wherein a base station provides energy in space to a remote station.

It is another object of the invention to provide such a method and apparatus wherein an antenna on the remote station has an effective area greater than its physical area.

It is another object of the invention to provide the antenna on an electronic chip or printed circuit board.

These and other objects of the invention will be more fully understood from the following detailed description of the invention on reference to the illustration appended hereto.

DESCRIPTION OF THE PREFERRED EMBODIMENTS

Recharging Apparatus

Figure 1:
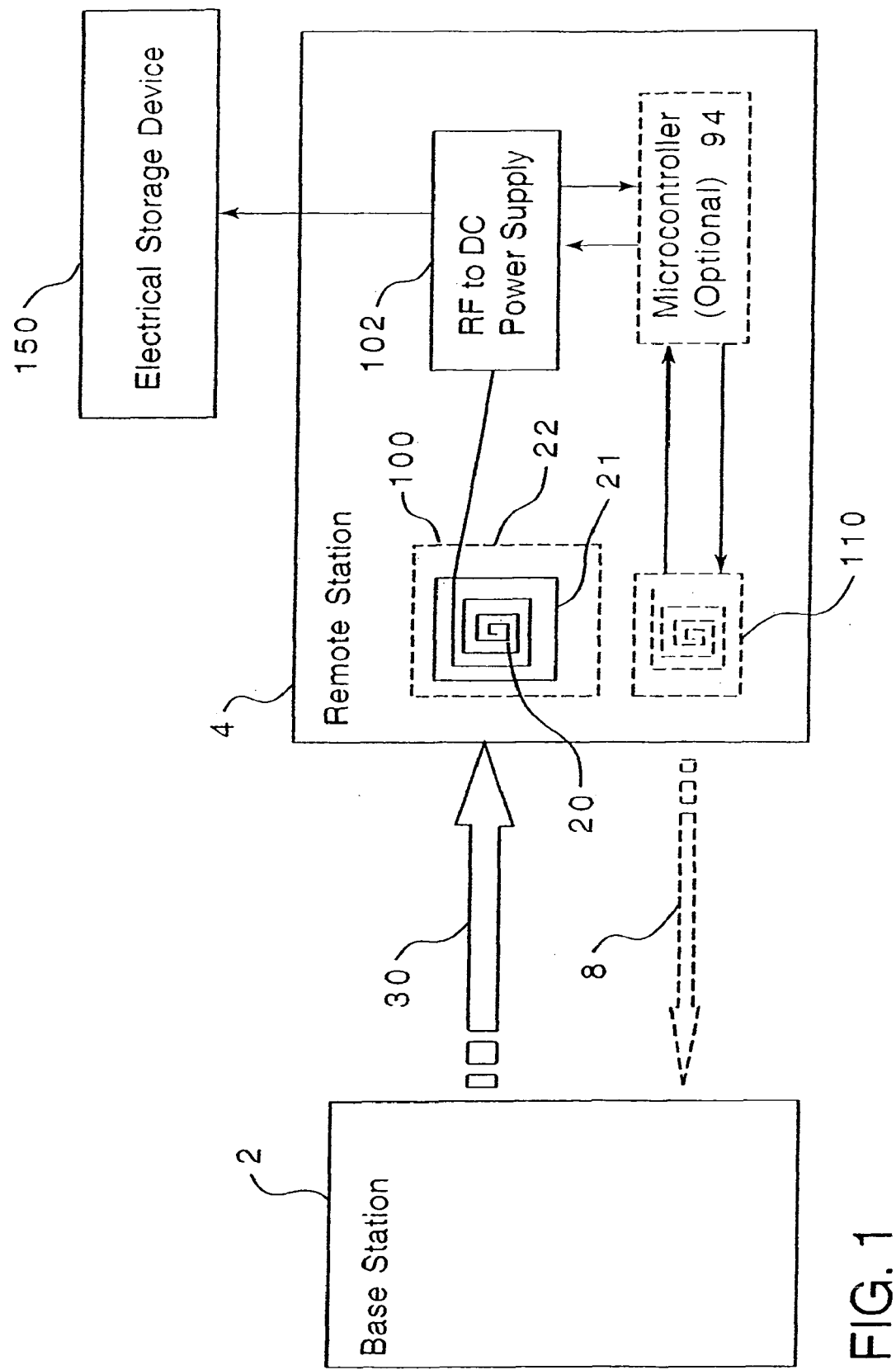
FIG. 1 is a schematic illustration of a recharging apparatus employable with the method of the invention.

In one embodiment shown in FIG. 1, an apparatus and associated method for remote energizing of power storage devices comprises a base station 2 and a remote station 4. The base station 2 has a means for transmitting energy 30 in space to the remote station 4. The transmission of energy 30 can be through RF. The remote station 4 has a means for receipt of the transmitted energy 30 and converting the transmitted energy 102 into DC power for energizing the power storage device 150 on the object of interest. The receipt of the transmitted energy 30 on the remote station 4 of this invention is through one or more antennae 100 on the remote station wherein at least one antenna 20 has an effective antenna area 22 greater than its physical area 21. The effective area 22 of the antenna is made greater than its physical area through the use of an LC tank circuit in the antenna. The use of an antenna 100 that has an effective area greater 22 than its physical area 21 enables the creation of small remote stations that can be used to energize small electronic energy storage devices 150. The remote station 4 may also include microcontroller 94 to store, manipulate and transmit information 8 back through antenna 110 to the base station 2.

Ambient Energy Recharging Apparatus

Figure 2:
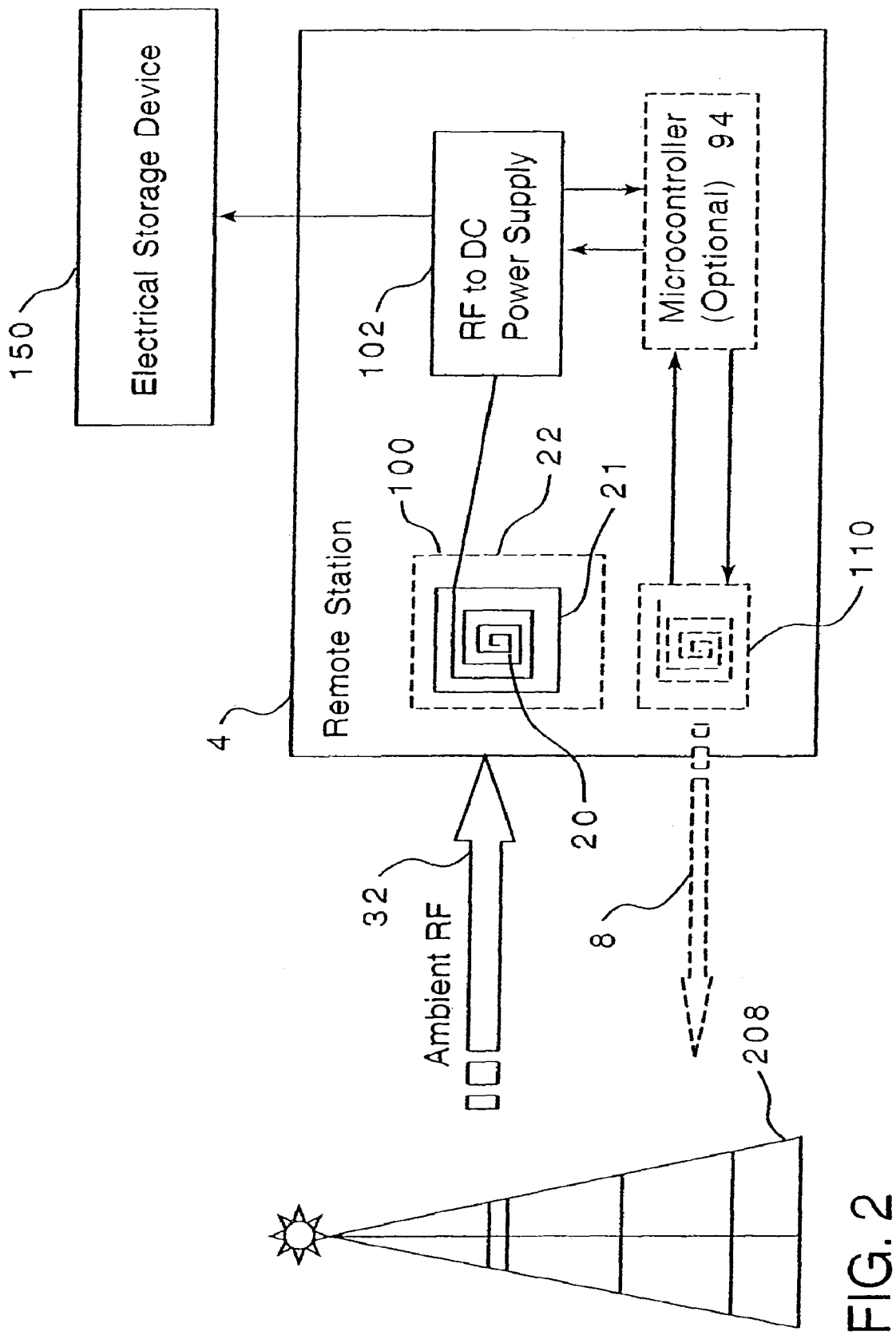
FIG. 2 is a schematic illustration of ambient energy recharging apparatus constructed in accordance with the invention.

In another embodiment as shown in FIG. 2 an apparatus and associated method consist of a small remote station having a means for receipt of ambient energy 32 from the non-cooperating environment 208 and energizing power storage devices 150 of objects of interest. The remote station 4 consists of one or more antennae 100 used to harvest the ambient energy 32 and circuitry 102 for converting this ambient energy into DC power for energizing power storage devices 150. The effective area of the antenna 22 is made greater than its physical area 21 through the use of an LC tank circuit in the antenna. The use of an antenna 100 that has an effective area greater 22 than its physical area 21 enables the creation of small remote stations that can be used to energize small electronic energy storage devices 150. The remote station 4 may also include microcontroller 94 to store, manipulate and transmit information 8 back to a base station 2 (not shown).

UWB Recharging Apparatus

Figure 3:
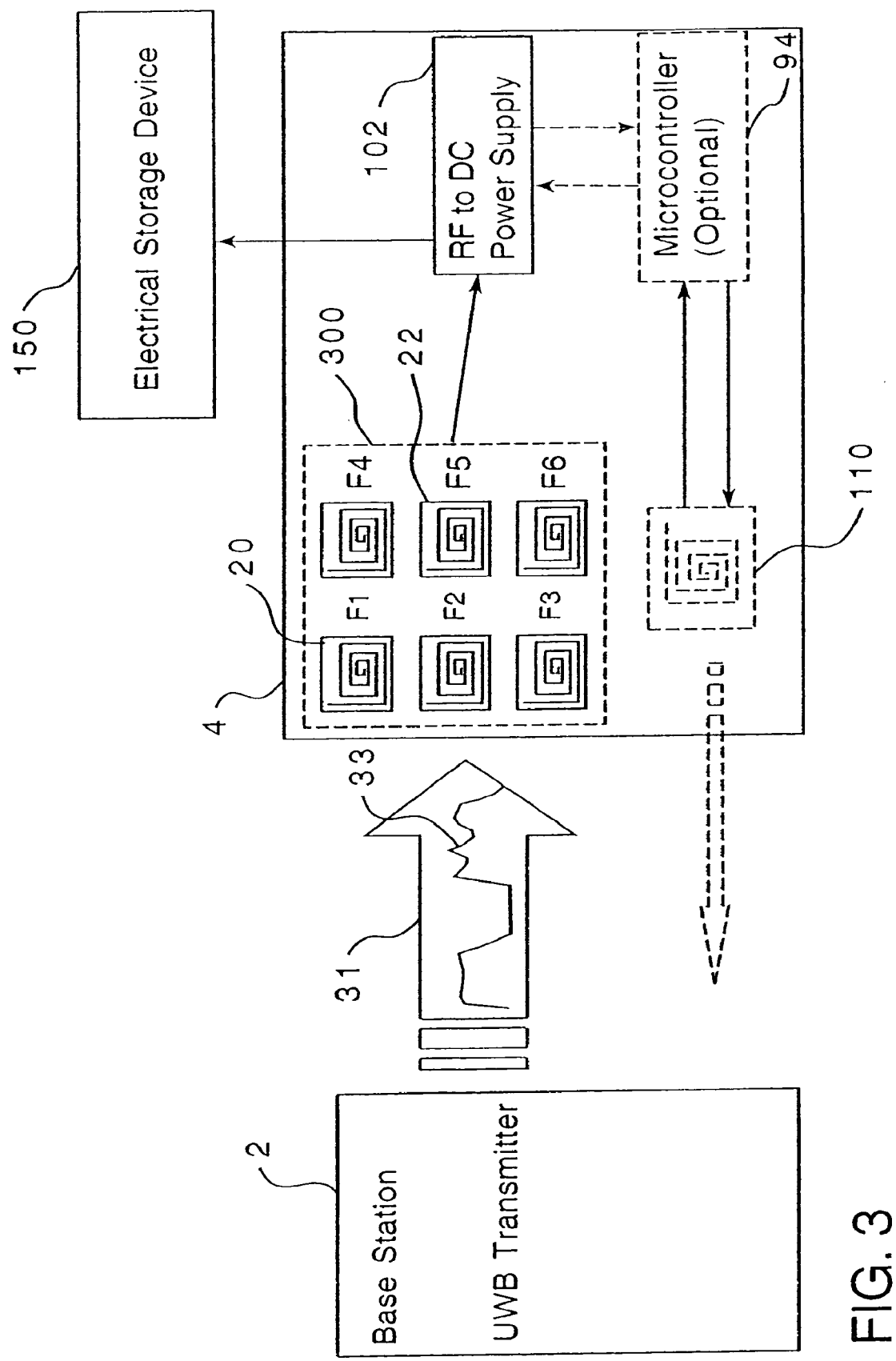
FIG. 3 is a schematic illustration of UWB Recharging Apparatus constructed in accordance with the invention.

In yet another embodiment of the present invention as shown in FIG. 3, an apparatus and associated method for remote energizing of power storage devices comprises a base station 2 and a remote station 4. The base station 2 has a means for transmitting energy 31 in space to the remote station 4 using ultra-wide band (UWB) 33. The remote station 4 has a means for receipt of the transmitted energy 31 in the form of ultra-wide band 33 through the use of an array 300 of multiple discrete antenna 20 each tuned to a separate frequency of the UWB. The transmitted energy 31 is converted into DC power 102 for energizing the power storage device 150 on the object of interest. Antennae 20 that make up the array that is used to harvest the transmitted energy each have an effective antenna 22 area greater than its physical area 21. The effective areas of the antennae in the array are made greater than their physical area through the use of an LC tank circuits in the antennae. The use of an antenna array 300 to harvest energy transmitted in the form of UWB wherein the antennae have an effective area greater than their physical area enables the creation of a small remote station that can be used to energize small electronic energy storage devices 150. The use of UWB enables the transmission of energy that is less likely to be detected or scrambled. This has major benefits in military applications wherein UWB can be used to discretely transmit energy to power storage units on troops or devices in the field. The remote station 4 may also include microcontroller 94 to store, manipulate and transmit information 8 back to a base station 2.

Effective Area

For the different embodiments of this invention, the receipt of the transmitted energy on the remote station is through one or more antennae on the remote station wherein at least one antenna has an effective antenna area greater than its physical area. The effective area of the antenna is made greater than its physical area through the use of an LC tank circuit in the antenna. The use of an antenna that has an effective area greater than its physical area enables the creation of small remote stations that can be used to energize small electronic energy storage devices.

"Effective area" of the antenna refers to the fact that a tuned antenna may have an effective area that is larger than its geometric area. The phenomenon was explained by Reinhold Rudenberg in 1908 [Rudenberg, Reinhold, "Den Empfang Elektrischer Wellen in den Drahtlosen Telegraphie" ("The Receipt of Electric Waves in the Wireless Telegraphy") Annalen den Physik IV, 25, 1908, p. 446-466.] and the description has been expanded upon over the years by many others.

As stated in U.S. Pat. No. 5,296,866, "Rudenberg teaches that the antenna interacts with the incoming field, which may be approximately a plane wave, causing a current to flow in the antenna by induction. The [antenna] current, in turn, produces a field in the vicinity of the antenna, which field, in turn, interacts with the incoming field in such a way that the incoming field lines are bent. The field lines are bent in such a way that the energy is caused to flow from a relatively large portion of the incoming wave front, having the effect of absorbing energy from the wave front into the antenna from a wave front which is much larger than the geometrical area of the antenna."

While the concept of effective area may be known, implementing it in antenna design and construction is not easy or obvious U.S. Pat. No. 5,296,866 teaches making active antennas that have greater effectiveness through use of discrete circuitry. U.S. Pat. No. 4,857,893 discloses the concept of making an antenna on a chip that use magnetic films around each antenna conductor in order to increase the inductance of the coil.

U.S. patent application Ser. No. 09/951,032 (Mickle) which is a CIP of U.S. Pat. No. 6,289,237 discloses an antenna on a chip that has an effective area greater than its physical area. The disclosures of this application and this patent are incorporated herein by reference. The effective area of the antenna is made greater than its physical area through the use of an LC tank circuit in the antenna. This is accomplished through the use in the (1) antenna of interelectrode capacitance and inductance and jointly or severally the (2) parasitic capacitance and inductance of the chip (die) to form the LC tank circuit. The benefit of utilizing the interelectrode capacitance and inductance and parasitic capacitance and inductance to form the LC tank circuit is that no additional discrete circuitry is required to provide the antenna with an effective area greater than its physical area. More important, the use of the LC tank circuit means that use of magnetic films around each antenna conductor is not required. This simplifies the production of the antenna on a chip and potentially allows the design of ultra-small antenna on a chip.

Data showing evidence of large effective area of antenna compared to the physical area on the antenna, is disclosed in U.S. patent application Ser. No. 09/951,032 (Mickle) which is a CIP of U.S. Pat. No. 6,289,237. Additionally, this application provides disclosure of conversion means from the transmitted energy to DC (or AC) voltage.

Printed Remote Station

One method of producing a remote station of this invention is through a semiconductor production technique that effectively creates a single monolithic chip assembly that includes all of the circuitry necessary to produce a functionally complete remote station. The chip can be in the form of a device selected from a CMOS device and/or a MEMS device.

Figure 4A:
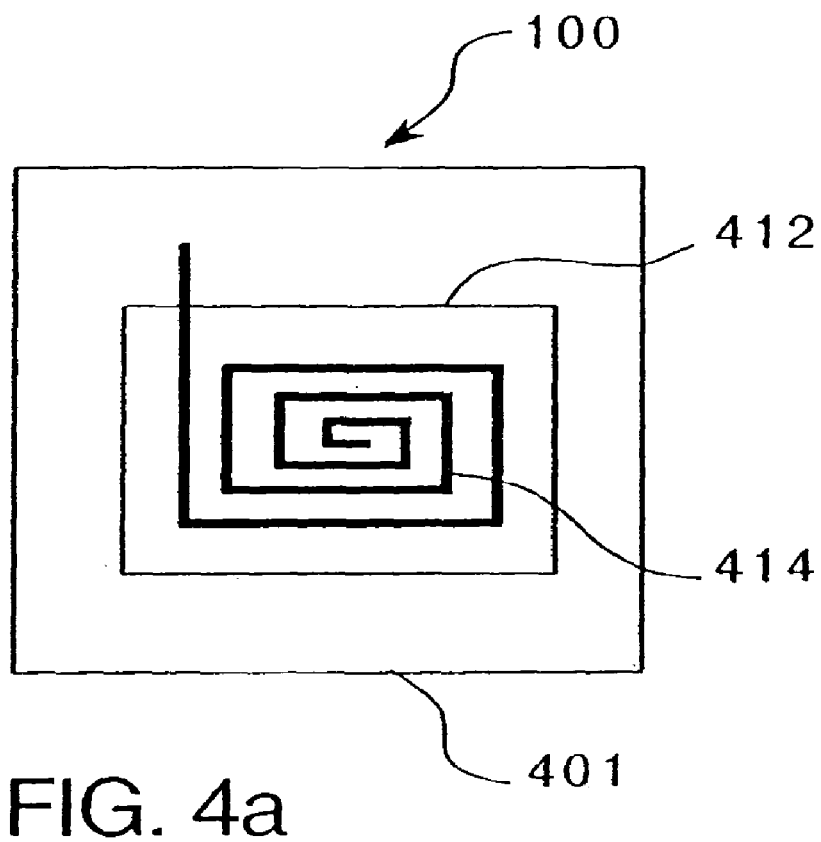
FIGS. 4a and 4b are a schematic illustrations of the antenna on a remote station that has been printed.
Figure 4B:
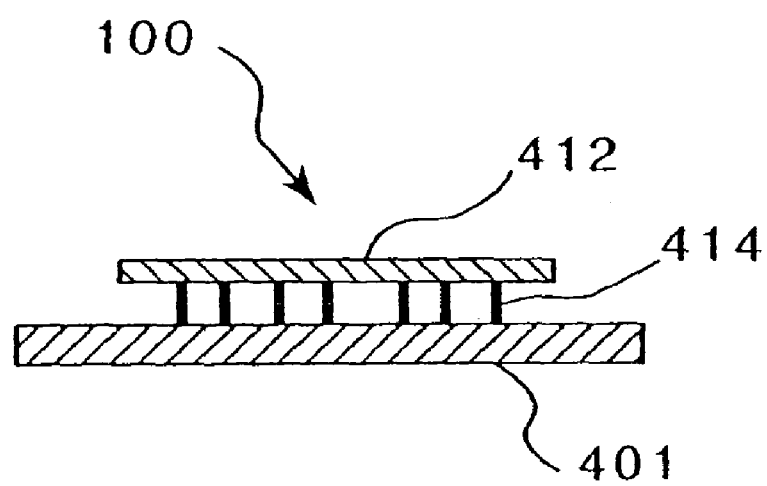

Another method of producing a remote station of this invention is through printing of antenna and all of the circuitry necessary to produce a functionally complete remote station on a suitable substrate. A printed antenna that has an effective area greater than its physical area the antenna is shown in FIGS. 4a and 4b and can be constructed as follows:

a. An antenna is designed with specific electrode and interelectrode dimensions (414) so that when covered with, or deposited on, a substrate of appropriate capacitance, an LC "tank" circuit will form.

b. The antenna design is printed onto to a non-conductive substrate (plastic film, glass, or the like) 401 using commercially available conductive compositions (i.e., conductive epoxy, conductive ink, and the like). The design 414 is printed using standard printing techniques such as ink jet, or silkscreen, for example.

c. A film of material (412) that has specific capacitance and insulating properties is printed on top of the antenna. This film (412) will provide the antenna to for the LC "tank" circuit.

Other electronic items such as diodes (not shown) can then be printed onto the substrate in order to form a printed charge device of this invention.

It will be appreciated that the present invention provides a method of energizing a power storage device wherein a source of energy is, (a) in one embodiment transmitted from a base station to a remote station and, (b) in another embodiment, is received by the remote station from ambient energy which may be RF power and, (c) in yet another embodiment, involves transmission of energy of ultra-wide band frequency or frequencies. The antenna receives the energy and the circuitry on the base station provides for conversion of the energy into DC power which is subsequently delivered to the power storage device.

The method preferably includes employing as the antenna an antenna formed on an electronic chip. The antenna may be formed by printing on a substrate on the remote station, employing conductive and electrically insulating portions. The remote station may employ an LC tank circuit in association with the antenna or in the antenna to establish an effective area of the antenna greater than the physical area.

In the alternative all three embodiments regardless of whether using a base transmitted energy or ambient energy or ultra-wide band frequency or frequencies may be employed with antennas other than antennas having an effective area greater than the physical area.

Whereas particular embodiments of the invention have been described hereinabove for purposes of illustration, it will be evident to those skilled in the art that numerous variations of the details may be made without departing from the invention as defined in the appended claims.

We claim:

1. A method, comprising:

receiving power at a remote station via a plurality of antennas coupled to the remote station, the received power being associated with a plurality of frequencies within an ultra-wide frequency band, each antenna from the plurality of antennas of the remote station configured to receive a unique frequency from the plurality of frequencies within of the ultra-wide band, each antenna from the plurality of antennas having an effective area greater than a physical area of that antenna as a result of a circuit formed within that antenna, wherein the plurality of antennas are formed on a substrate, the circuit formed within each antenna from the plurality of antennas being based on (1) a specific capacitance of the substrate, and (2) specific electrode and inter-electrode dimensions of that antenna; and converting the received power to a DC power at the remote station.

2. The method of claim 1, wherein the effective antenna area of each antenna from the plurality of antennas is increased by the circuit formed therein.

3. The method of claim 1, wherein the circuit formed within each antenna from the plurality of antennas is an LC circuit, the LC circuit further being defined by a parasitic capacitance of the substrate and an inductance of the substrate.

4. The method of claim 1, wherein the remote station is coupled to a power storage device, the method further comprising:

sending at least a portion of the DC power from the remote station to the power storage device to energize the power storage device.

5. The method of claim 1, wherein a receiving strength of at least one antenna from the plurality of antenna is independent of magnetic induction, a number of turns of a loop in that at least one antenna, or an area of the loop of that at least one antenna.

6. The method of claim 1, wherein the remote station includes a microcontroller, the method further comprising:

powering the microcontroller using at least a portion of the DC power, the microcontroller configured to process power-related data and to control wireless transmission of the power-related data from the remote station to a base station.

7. The method of claim 1, wherein the remote station is formed on a single semiconductor chip.

8. A method, comprising:

receiving power at a remote station through at least one antenna, the received power being associated with an RF frequency band, the at least one antenna having an effective area greater than a physical area of the at least one antenna the at least one antenna having a circuit defined by a specific capacitance of a substrate on which the at least one antenna is disposed and specific electrode and inter-electrode dimensions of the at least one antenna; and converting the received power to a DC power at the remote station.

9. The method of claim 8, wherein the RF frequency band is an ultra-wide frequency band.

10. The method of claim 8, wherein the remote station includes a power storage device, the method further comprising:

sending the DC power to the power storage device.

11. The method of claim 8, wherein the circuit is formed within the at least one antenna without any additional discrete circuitry being electrically connected to the at least one antenna.

12. The method of claim 8, wherein the circuit is an LC tank circuit configured to increase the effective area of the at least one antenna.

13. The method of claim 8, wherein the remote station includes a communication antenna and a microcontroller, the method further comprising:

storing power-related information at the microcontroller of the remote station; and sending the power-related information to a base station via the communication antenna of the remote station.

14. An apparatus, comprising:

a storage device; and a remote station including at least one antenna and being coupled to the storage device, the remote station configured to receive power from a base station through the at least one antenna, the received power being associated with an RF frequency band, the remote station configured to convert the received power to a DC power, the at least one antenna disposed on a substrate, the at least one antenna having an effective area greater than a physical area of the at least one antenna, the at least one antenna having a circuit defined by a specific capacitance of the substrate and specific electrode and inter-electrode dimensions of the at least one antenna, the storage device configured to store at least a portion of the DC power.

15. The apparatus of claim 14, wherein the RF frequency band is an ultra-wide frequency band.

16. The apparatus of claim 15, wherein each antenna from the at least one antenna is tuned to a mutually exclusive portion of the ultra-wide frequency band.

17. The apparatus of claim 14, wherein the remote station further includes a microcontroller and a communication antenna separate from the at least one antenna, the microcontroller configured to cause the communication antenna to wirelessly transmit information to a base station when the microcontroller is powered by at least a portion of the DC power.

18. The apparatus of claim 14, wherein the circuit is formed within the at least one antenna without any additional discrete circuitry being electrically connected to the at least one antenna.

19. The apparatus of claim 14, wherein the effective antenna area of the at least one antenna having the circuit formed therein is greater than an effective antenna area of the at least one antenna not having the circuit formed therein.

20. The apparatus of claim 14, wherein the circuit is an LC tank circuit.

* * * * *

UNITED STATES PATENT AND TRADEMARK OFFICE
CERTIFICATE OF CORRECTION

PATENT NO. : 8,090,414 B2
APPLICATION NO. : 12/332463
DATED : January 3, 2012
INVENTOR(S) : Marlin H. Mickle et al.

It is certified that error appears in the above-identified patent and that said Letters Patent is hereby corrected as shown below:

Column 1, line 37, "inductive" should read --an inductive--.
Column 1, line 44, "energized" should read --energize--.
Column 2, line 6, "camera's" should read --cameras--.
Column 2, line 23, "in" should read --on--.
Column 2, line 23, "Magnetic" should read --Magnetics--.
Column 2, line 24, "ThinFilm" should read --Thin-Film--.
Column 2, line 50, "in order" should read --in order to--.
Column 3, line 1, "for small" should read --for a small--.
Column 3, line 12, "antenna" should read --antenna(e)--.
Column 3, line 13, "(e) on a" should read --on a--.
Column 3, line 59, "are a" should read --are--.
Column 4, line 14, "area greater 22" should read --area 22 greater--.
Column 4, line 33, "greater 22" should read --22 greater--.
Column 4, line 56, "circuits" should read --circuit--.
Column 5, line 17, "Receipt" should read --Reception--.
Column 5, line 17, "Electric" should read --Electrical--.
Column 5, line 17, "in the Wireless" should read --in Wireless--.
Column 5, line 39, "use" should read --uses--.
Column 6, line 12, "area the antenna" should read --area--.
Column 6, line 18, "onto to" should read --onto--.
Column 6, line 67, "within of" should read --within--.
Column 6, line 67, "ultra-wide band" should read --ultra-wide frequency band--.

Signed and Sealed this
Seventeenth Day of July, 2012

David J. Kappos
*Director of the United States Patent and Trademark Office*